(12) United States Patent
Tsai (10) Patent No.: US 8,582,926 B2
(45) Date of Patent: Nov. 12, 2013

(54) HAND-HELD SCANNING SYSTEM AND METHOD THEREOF

(75) Inventor: Mi-lai Tsai, Keelung (TW)

(73) Assignee: Genesys Logic, Inc., Shindian, Taipei (TW)

( * ) Notice: Subject to any disclaimer, the term of this patent is extended or adjusted under 35 U.S.C. 154(b) by 371 days.

(21) Appl. No.: 13/100,903

(22) Filed: May 4, 2011

(65) Prior Publication Data

US 2012/0183240 A1 Jul. 19, 2012

(30) Foreign Application Priority Data

Jan. 14, 2011 (TW) .............................. 100101490 A (51) Int. Cl.
*G06K 9/22* (2006.01)
(52) U.S. Cl.
USPC .......................................................... 382/313
(58) Field of Classification Search
USPC ........ 318/400.4, 602; 341/143, 160; 345/165; 358/408; 359/17, 202.1; 382/313
See application file for complete search history.

(56) References Cited

U.S. PATENT DOCUMENTS

| | | | | |
|---|---|---|---|---|
| 5,595,445 A | * | 1/1997 | Bobry | .............................. 400/88 |
| 6,407,683 B1 | * | 6/2002 | Dreibelbis | .................... 341/111 |
| 2012/0092461 A1 | * | 4/2012 | Fisker et al. | .................... 348/46 |

* cited by examiner

*Primary Examiner* — Gregory F Cunningham (57) ABSTRACT

A hand-held scanning system and method thereof are described. A look-up table is created to generate a mapping relation between a plurality of reference amplitudes and a plurality of corresponding sampled positions. An analog-to-digital converter samples an analog signal and converts it into a digital signal. The digital signal represents a mapping relation between the sampled positions of the movement distance and the corresponding scanning amplitudes of the signal intensity. The hand-held scanning system ascertains the sampled positions corresponding to a former scanning amplitudes and a present scanning amplitudes according to the look-up table during the scanning stage for detecting the position variation status to determine whether the trigger signal is activated for image scanning or not.

13 Claims, 9 Drawing Sheets

HAND-HELD SCANNING SYSTEM AND METHOD THEREOF

BACKGROUND OF THE INVENTION

1. Field of the Invention

The present invention relates to a scanning system and method thereof, and more particularly to a hand-held scanning system and method thereof.

2. Description of the Prior Art

With the rapid development of information technology, the usage of electronic documents is very frequent and wide. Particularly, for the convenience of processing, transferring and saving a paper document, the paper document needs to be scanned and transformed to be an electronic document by a scanner. The scanner generally includes a flatbed scanner and a hand-held scanning system. However, for attaining an object of being convenient to scan, the hand-held scanning system is widely used to scan a small document or a document of not being scanned by the flatbed scanner, and can make the document content to be integrally transformed to be an image file for the convenience of processing and saving.

Figure 1:
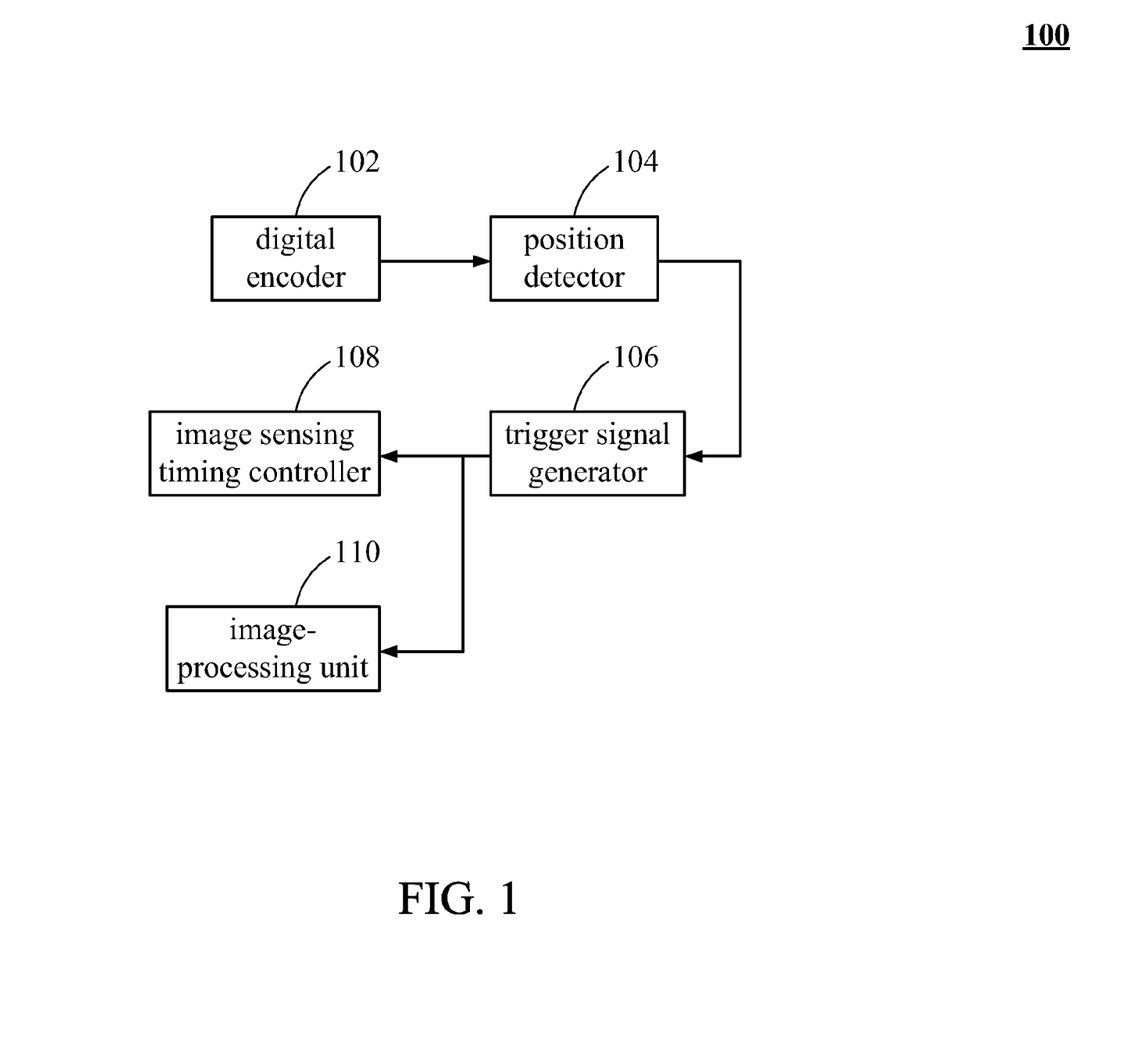
FIG. 1 is a block diagram of a hand-held scanning system in a prior art.

FIG. 1 is a block diagram of a hand-held scanning system 100 in a prior art. The hand-held scanning system 100 includes a digital encoder 102, a position detector 104, a trigger signal generator 106, an image sensing timing controller 108 and an image-processing unit 110. The digital encoder 102 includes a rotary wheel having a mask grating, a light source and an optical sensor having a comparator, thereby outputting a digital signal with two phases. The position detector 104 detects variation values of the two phases for detecting a position variation value of the hand-held scanning system 100 on a scanning document. The trigger signal generator 106 sends out a trigger signal according to the position variation value. The amount of the trigger signal is in direct ratio with that of a scanning line, but whether the amount of the scanning line is even within the range of the system movement or not, it is closely related to the scanning quality of the document. The image sensing timing controller 108 uses the trigger signal to control a contact image sensor for scanning the document. The image-processing unit 110 can process a scan image, such as saving, zooming, editing and so on.

However, when the hand-held scanning system 100 is moved suddenly fast or abruptly slow, namely the movement velocity of the hand-held scanning system 100 is non-constant, it results that the trigger signal generator 106 can not exactly generate the trigger signal according to the movement distance. In other words, the movement velocity of the hand-held scanning system 100 is varied (namely system 100 is moved at a non-constant velocity), and the trigger signal generator 106 sends out the trigger signal at an equal time interval, so the amounts of the scanning trigger signal in two equal movement ranges are not equal. As a result, the image sensor cannot sense the document in time and the scanning quality of the document is not good. In view of this, it need develop a new scanning system for solving the above problem.

BRIEF SUMMARY OF THE INVENTION

An object of the present invention is to provide an hand-held scanning system and method thereof, being capable of producing a former scanning amplitude and a present scanning amplitude during a scanning stage, and ascertaining the sample positions corresponding to the former scanning amplitude and a present scanning amplitude according to a look-up table to detect whether the hand-held scanning system being under a position variation status or not for determining whether a trigger signal is activated for image scanning or not.

To achieve the above object, in accordance with the present invention, a hand-held scanning system is provided, comprising an analog encoder, an analog-to-digital converter, a calculation unit, a normalization device, a look-up table, a position variation detection unit, a scanning trigger generator, an image sensing timing controller and a scanned-image processing unit. The calculation unit further comprises a wave crest detector, a wave trough detector and an amplitude calculator. The normalization device comprises a subtractor, a divider, a multiplier and an offset unit.

The analog encoder is used to generate an analog signal, which represents a mapping relation of a movement distance of the hand-held scanning system and a corresponding signal intensity. The analog-to-digital converter samples the analog signal to form a digital signal, which represents a mapping relation between a plurality of sampled positions of the movement distance and a plurality of corresponding scanning amplitudes of the signal intensity. The calculation unit detects a maximum amplitude and a minimum amplitude of these scanning amplitudes and calculates an amplitude difference between the maximum amplitude and the minimum amplitude.

The normalization device normalizes these scanning amplitudes according to each difference between these scanning amplitudes and the minimum amplitude, the amplitude difference and a predetermined target value. The normalization device normalizes these scanning amplitudes according to the following equation:

$$\text{a normalized scanning amplitude} = (V\_I - V\_S) \times (1/V\_PP) \times TA + O1 \quad (E1)$$

where V_I represents the scanning amplitude, V_S represents the minimum scanning amplitude, V_PP represents the amplitude difference, TA represents the predetermined target value, and O1 represents an offset value corresponding to the difference (V_I−V_S). The look-up table creates a mapping relation of a plurality of reference amplitudes and these corresponding sampled positions to make one reference amplitude be corresponding to at least one sampled positions.

By the former scanning amplitude and a present scanning amplitude of theses scanning amplitudes, the position variation detection unit detects the sample positions corresponding to the former scanning amplitude and a present scanning amplitude according to the look-up table to ascertain whether the hand-held scanning system is under a position variation status or not. The scanning trigger generator produces a trigger signal according to the position variation status for activating an image sensor of the hand-held scanning system for image scanning.

A scanning method of the present invention comprises the following steps:

(1) creating a look-up table to form a mapping relation of a plurality of reference amplitudes and a plurality of corresponding sampled positions to make one reference amplitude be corresponding to at least one sampled positions;

(2) employing an analog encoder to generate an analog signal, which represents that a mapping relation of a movement distance of the hand-held scanning system and a corresponding signal intensity;

(3) employing an analog-to-digital converter to sample the analog signal for forming a digital signal, which represents a mapping relation of these sampled positions of the movement distance and a plurality of corresponding scanning amplitudes of the signal intensity;

(4) employing a calculation unit to detect a maximum amplitude and a minimum amplitude of these scanning amplitudes;

(5) employing the calculation unit to calculate an amplitude difference between the maximum amplitude and the minimum amplitude;

(6) employing a normalization device to normalize these scanning amplitudes according to each difference between these scanning amplitudes and the minimum amplitude, the amplitude difference and a predetermined target value;

(7) employing a position variation detection unit to ascertain the sampled positions corresponding to a former scanning amplitude and a present scanning amplitude of these scanning amplitudes according to the look-up table for detecting whether the hand-held scanning system being under a position variation status or not when the hand-held scanning system being moved; and if the sampled positions of the former scanning amplitude and the present scanning amplitude being different form each other, the hand-held scanning system being under a position variation status; and (8) employing a scanning trigger generator to generate a trigger signal according to the position variation status to activate an image sensor of the hand-held scanning system for image scanning.

For more clearly and easily understanding the above content of the present invention, the following text will take a preferred embodiment of the present invention with reference to the accompanying drawings for detail description as follows:

DETAILED DESCRIPTION OF THE PREFERRED EMBODIMENTS

The preferred embodiment of the present invention will be detail described by the accompanying drawings and the following description. In the different drawings, the same labels represent the same and similar elements.

Figure 2:
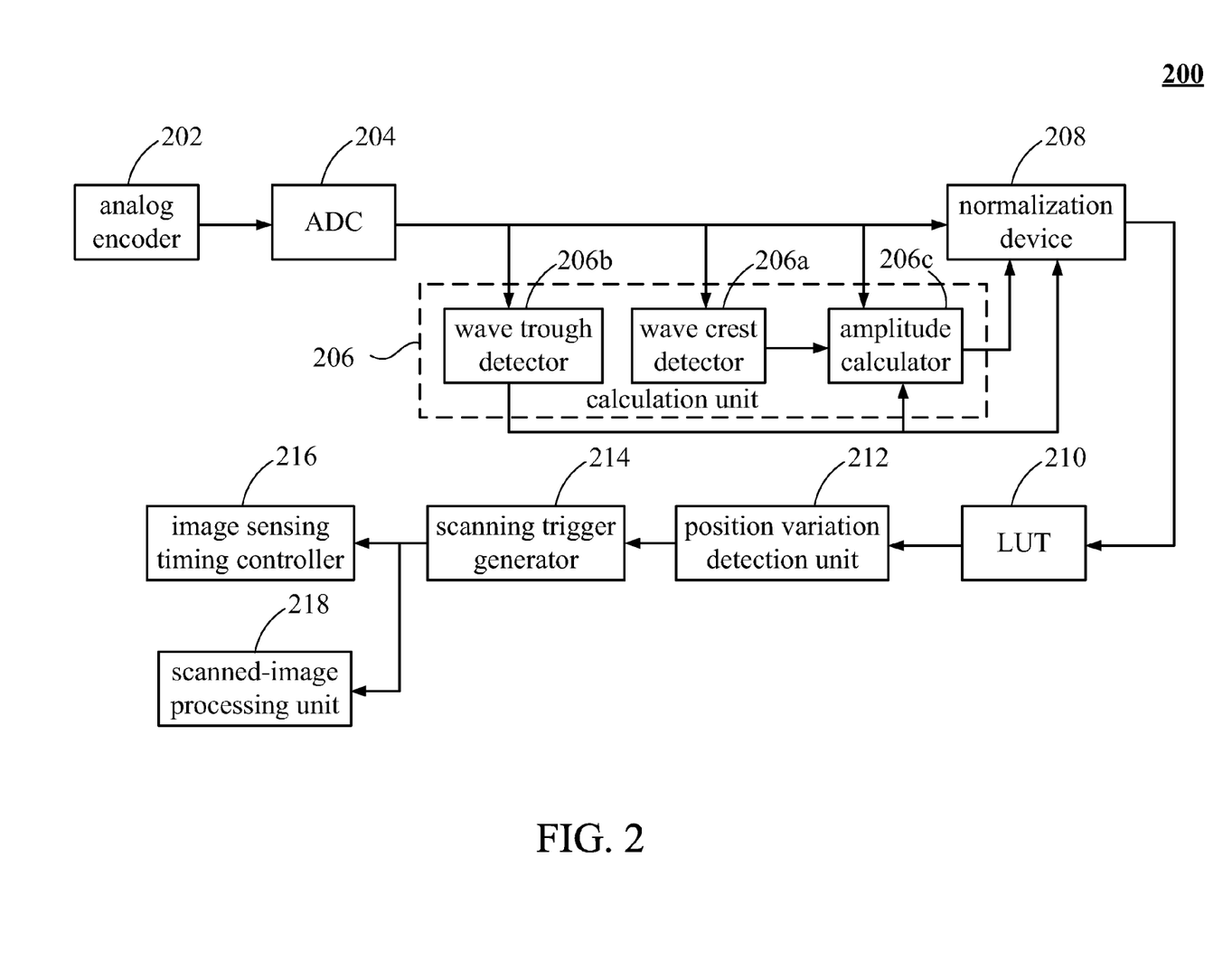
FIG. 2 is a block diagram of a hand-held scanning system in one embodiment of the present invention.

Referring to FIG. 2, which is a block diagram of a hand-held scanning system 200 according to one embodiment of the present invention. The hand-held scanning system 200 comprises an analog encoder 202, an analog-to-digital converter (ADC) 204, a calculation unit 206, a normalization device 208, a look-up table (LUT) 210, a position variation detection unit 212, a scanning trigger generator 214, an image sensing timing controller 216 and a scanned-image processing unit 218.

The analog encoder 202 is coupled to the ADC 204, the calculation unit 206 is coupled between the ADC 204 and the normalization device 208, the normalization device 208 is coupled to the LUT 210, the position variation detection unit 212 is coupled to the LUT 210, and the scanning trigger generator 214 couples the position variation device 212 to the image sensing timing controller 216 and the scanned-image processing unit 218.

Figure 3A:
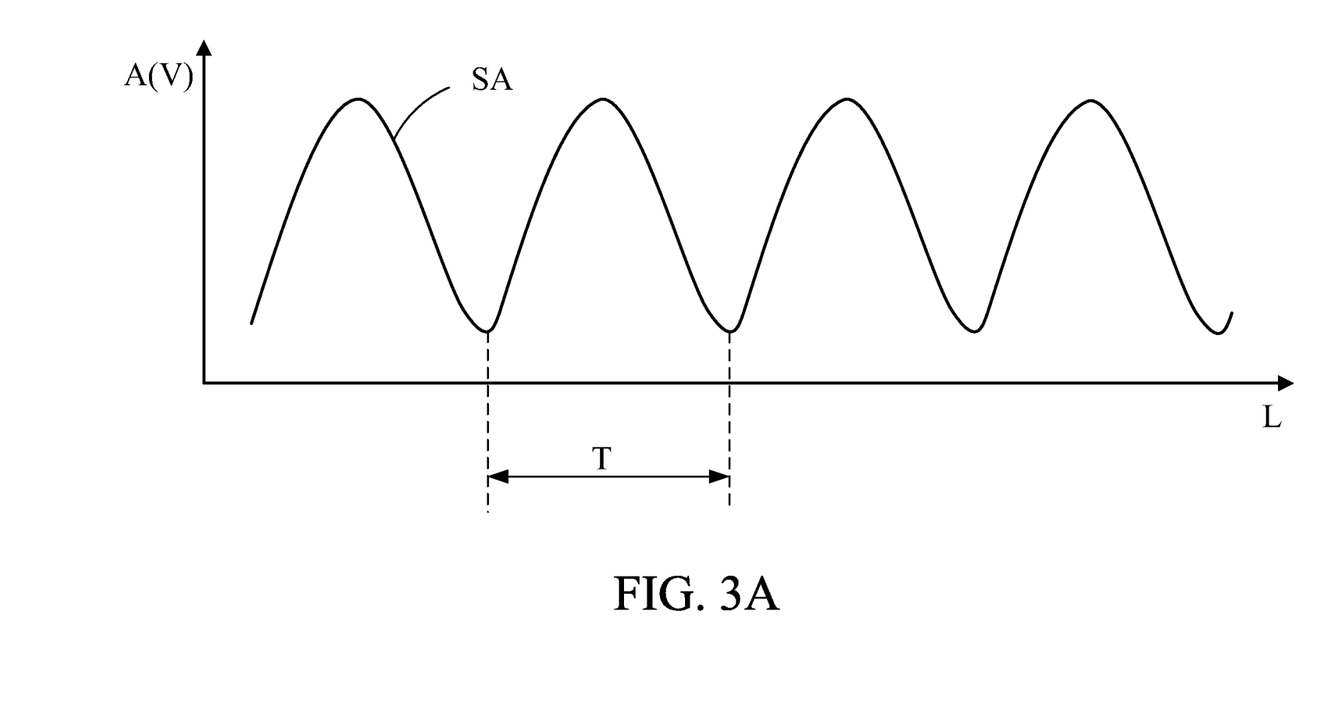
FIG. 3A is a wave curve illustrating an analog signal generated by the hand-held scanning system of one embodiment of the present invention during a calibration stage.
Figure 3B:
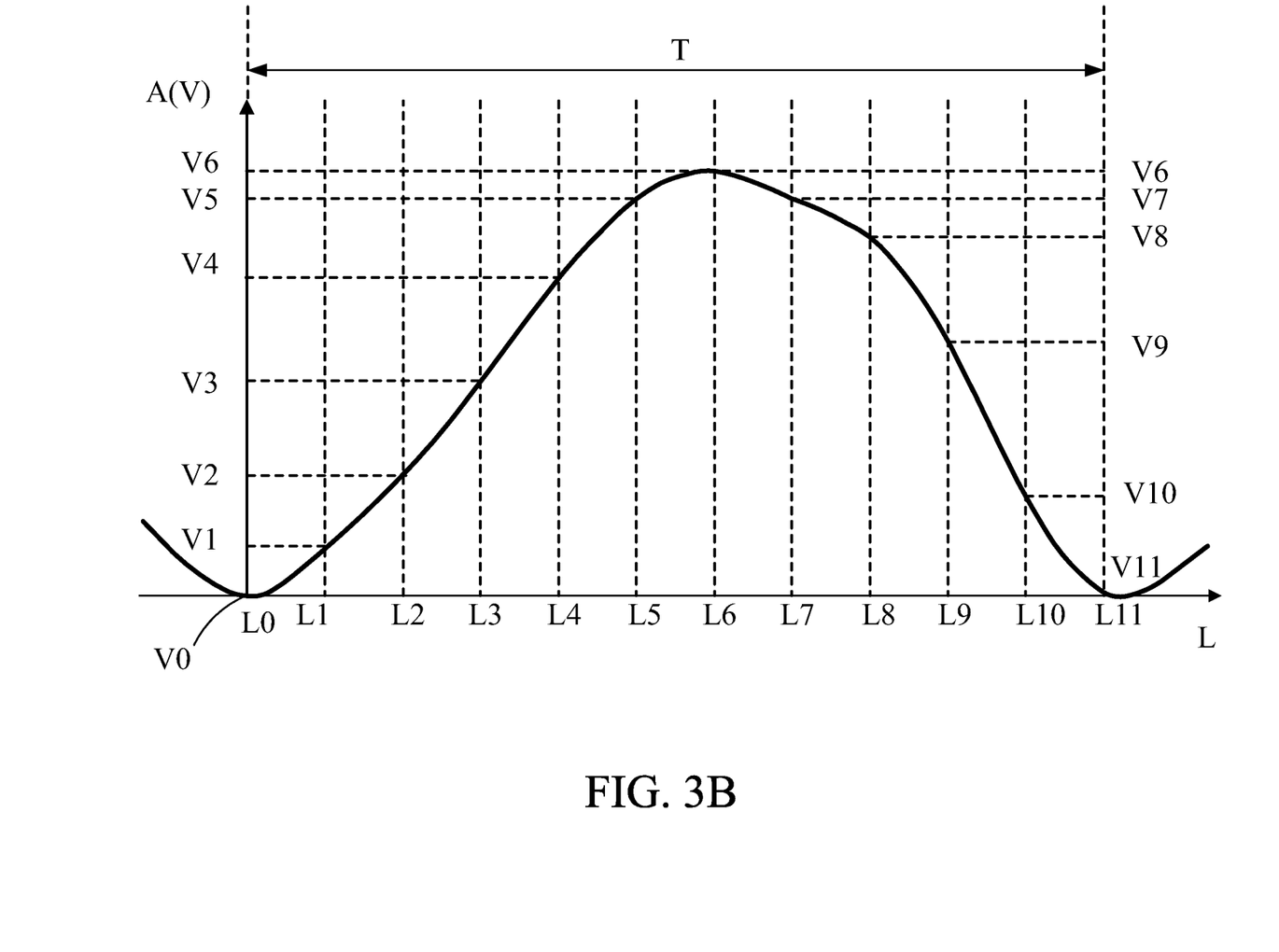
FIG. 3B is a wave curve of the analog signal and the digital signal in one period of FIG. 3A.

FIG. 3A shows a wave curve illustrating an analog signal generated by the hand-held scanning system 200 of one embodiment of the present invention during a calibration stage. When the hand-held scanning system 200 is moved at a constant velocity, the analog encoder 202 generates the analog signal having a fixed frequency. The analog signal is represented as a mapping relation between the signal intensity $A(V)$ of a longitudinal axis and the movement distance $(L)$ of a transverse axis. The signal intensity $A(V)$ is, for example, voltage. The analog signal is periodic along the movement distance. FIG. 3B is a wave curve of the analog signal and the digital signal in one period $(T)$ of FIG. 3A, wherein the analog signal is represented as the mapping relation of the signal intensity $A(V)$ and the movement distance $(L)$ during the one period $(T)$. Next, the hand-held scanning system 200 creates the LUT 210 during the calibration stage, and a detailed description is as follows.

The ADC 204 samples the analog signal of one period and creates the digital signal. The digital signal represents a mapping relation between a plurality of sampled positions of the movement distance $(L)$ and a plurality of scanning amplitudes of the signal intensity $A(V)$, respectively. Because the hand-held scanning system 200 is moved at a constant velocity, the intervals between these sampled positions are equal. Specifically, in FIG. 3B, the movement distance of the one period $(T)$ is divided into n sampled positions. These sampled positions are respectively corresponding to these scanning amplitudes of the signal intensity of the longitudinal axis, and these scanning amplitudes are respectively corresponding to a plurality of marks $V0\sim V(n-1)$. These marks $V0\sim V(n-1)$ increases with the increasing of the movement distance. For example, the movement distance of the hand-held scanning system 200 is 1.2 millimeter (mm) during the one period $(T)$ of the analog encoder 202, and an unit distance (or be named a scan resolution) between the trigger signals sent out by the scanning trigger generator 214 is 0.2 mm. Namely, when the scanning trigger generator 214 is triggered one time per 0.2 mm, the hand-held scanning system 200 can scan six times. The number of these sampled positions is greater than or equal to six, preferably a whole-number multiple of six. For example, the number of these sampled positions is twelve, and each one of the sampled positions $(L0\sim L11)$ is corresponding to one of the scanning amplitudes of the marks $(V0\sim V11)$.

The calculation unit 206 detects a maximum amplitude and a minimum amplitude of these scanning amplitudes and calculates a limit amplitude difference between the maximum amplitude and the minimum amplitude. The calculation unit 206 further comprises a wave crest detector 206a, a wave trough detector 206b and an amplitude calculator 206c, as shown in FIG. 2. The wave crest detector 206a detects the maximum amplitude of these scanning amplitudes, for example the scanning amplitude of the mark V6, as shown in FIG. 3B. The wave trough detector 206b detects the minimum amplitude of these scanning amplitudes, for example the scanning amplitude of the mark V0, as shown in FIG. 3B. And the amplitude calculator 206c calculates the amplitude difference of the maximum amplitude (V6) and the minimum amplitude (V0), as shown in FIG. 3B.

The normalization device 208 normalizes these scanning amplitudes according to each difference between these scanning amplitudes and the minimum amplitude, the limit amplitude difference and a predetermined target value. The normalization device 208 normalizes these scanning amplitudes according to the following equation:

$$\text{a normalized scanning amplitude} = (V\_I - V\_S) \times (1/V\_PP) \times TA + O1 \quad (E1)$$

In the equation (E1), V_I represents the scanning amplitude, V_S represents the minimum scanning amplitude, V_PP represents the limit amplitude difference, TA represents the predetermined target value, and O1 represents an offset value corresponding to the difference (V_I−V_S). The TA is, for example, a positive integer, and when the difference (V_I−V_S) is negative, the O1 needs to be added into the equation for making the normalized scanning amplitude greater than or equal to zero. The normalization processing purpose is that: when these scanning amplitudes generates variation in the movement distance (L), the normalization device 208 can set these scanning amplitudes within a predetermined range according to the maximum amplitude and the minimum amplitude and by the TA. The variation mentioned herein means that the wave crest and the wave trough of the analog signal in each one of period (T) are different from those in other periods.

Figure 3C:
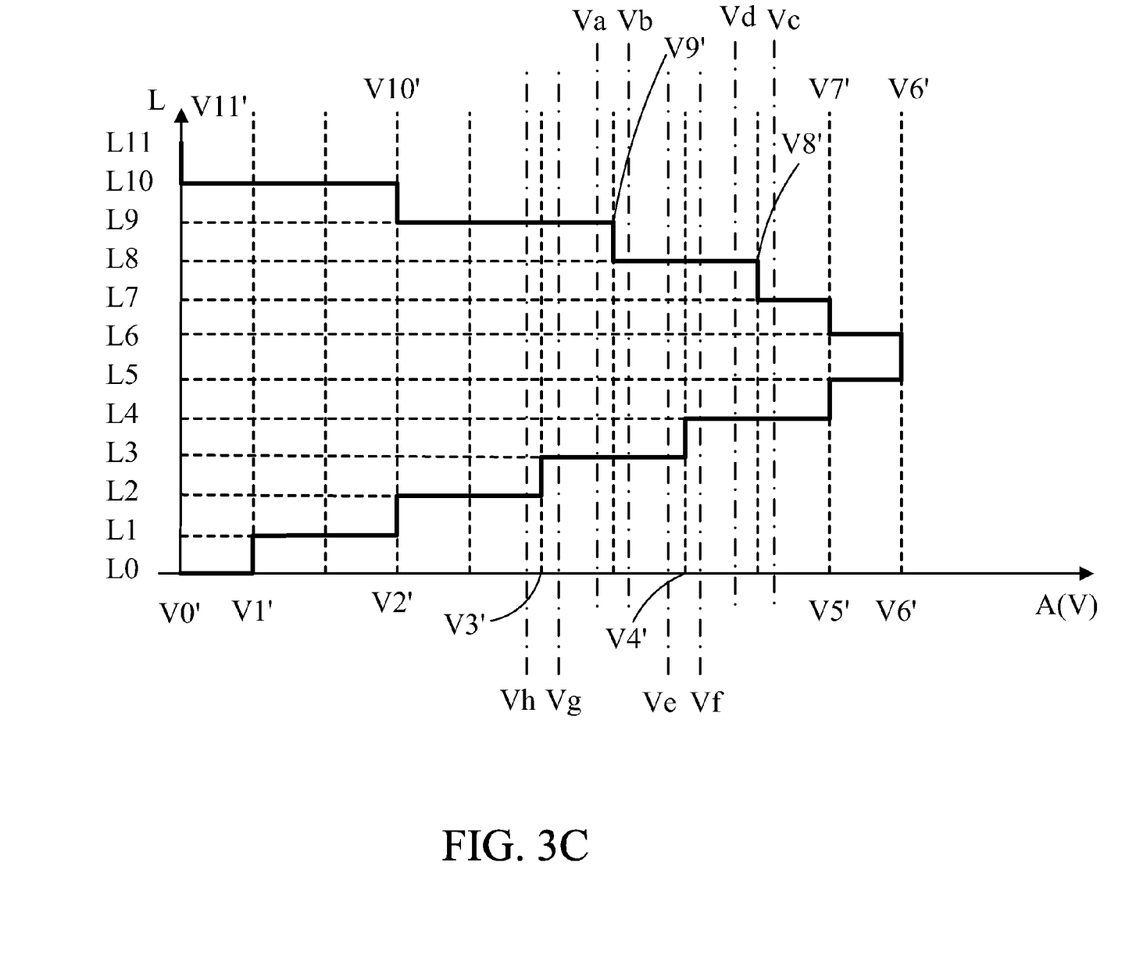
FIG. 3C is a mapping relation diagram of a plurality of reference amplitudes and a plurality of sampled positions corresponding to these reference amplitudes.

The LUT 210 can be created after above calculation. The LUT 210 shows a mapping relation between a plurality of reference amplitudes and these sampled positions. Each of these reference amplitudes is corresponding to at least one of the sampled positions, as shown in FIG. 3C, which is a mapping relation diagram of a plurality of reference amplitudes and a plurality of corresponding sampled positions. In FIG. 3C, a transverse axis represents the signal intensity A(V) forming some reference amplitudes V0'~V11', and a longitudinal axis represents the movement distance (L) divided into several sampled positions L0~L11, the intervals of which are equal. Specifically, the reference amplitudes V0'~V11' of FIG. 3C are corresponding to the amplitudes labeled by the marks V0~V11 of FIG. 3B, respectively. Further, in FIG. 3C, any one amplitude between each two adjacent reference amplitudes is corresponding to the same one sampled position. For example, any one amplitude between two adjacent reference amplitudes V1' and V2' is corresponding to the sampled position L1, the amplitudes between the reference amplitudes V2' and V3' are corresponding to the sampled position L2, and so on.

In the LUT 210, a total number of these reference amplitudes corresponding to these sampled positions is represented by a numerical value Y. The numerical value Y is greater than or equal to these sampled positions n. When the numerical value Y becomes greater, the asymmetry of the analog signal in one period gets easier to be analyzed. Namely, the difference between a former half and a latter half of the period gets easier to be analyzed. In one embodiment, the TA is equal to the numerical value Y, but not be limited to this, and may be an arbitrary value.

Figure 4:
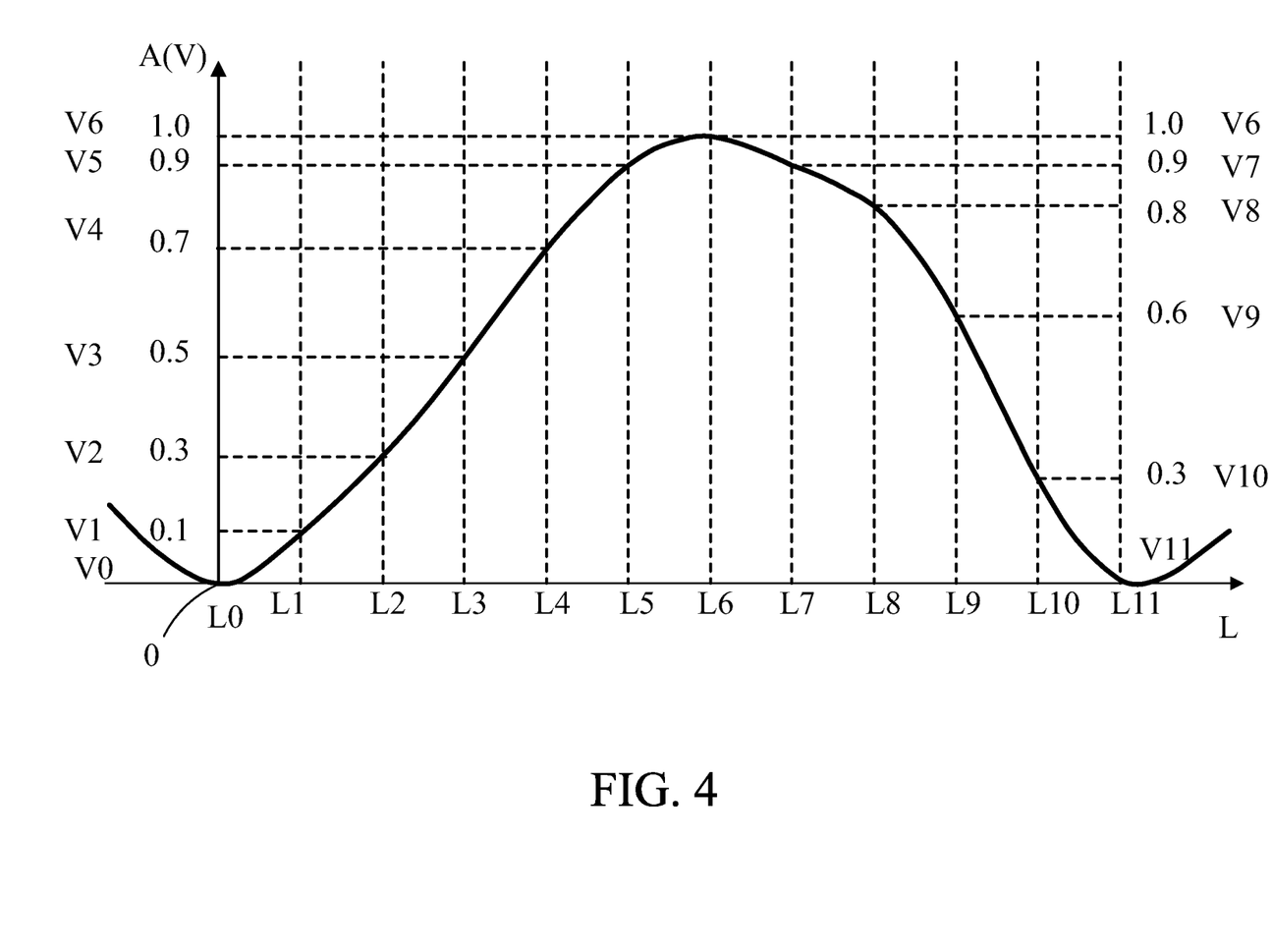
FIG. 4 is a wave curve illustrating one period of an analog signal and a digital signal generated by the hand-held scanning system of one embodiment of the present invention during a scanning stage.

After the hand-held scanning system 200 finishes the above calibration stage and creates the LUT 210, it will enter into a document-scanning stage. In the document-scanning stage, the hand-held scanning system 200 is moved at a non-constant velocity. The analog encoder 202 generates the analog signal. The analog signal is represented as the mapping relation between the signal intensity A(V) of a longitudinal axis and the movement distance (L) of a transverse axis, and the analog signal is periodic along the movement distance, as shown in FIG. 4. The expressive form of the analog signal in FIG. 4 is similar to that in FIG. 3B. The difference is that the analog signal of FIG. 4 is generated by the hand-held scanning system 200 moved at a non-constant velocity, so that the frequency of the analog signal is non-fixed. FIG. 4 shows a wave curve illustrating one period of the analog signal and the digital signal during a scanning stage in one embodiment of the present invention. The transverse axis represents the movement distance (L), and the longitudinal axis represents the signal intensity A(V), such as voltage. The analog signal is represented as the mapping relation of the signal intensity A(V) and the movement distance (L). For example, the analog signal is a sine-like wave. Namely, when the analog encoder 202 is moved, it can outputs the sine-like wave of the voltage level, which is stretched up-and-down with different strengths along the movement distance (L). It should be noted that, when the movement velocity of the hand-held scanning system 200 is higher, the frequency of the signal intensity is higher. Conversely, when the movement velocity thereof is lower, the frequency of the signal intensity is lower. In one embodiment, the analog encoder 202 includes a reflecting pattern or a rotary wheel having a mask grating, a light source and an optical sensor. The reflecting pattern or the rotary wheel having the mask grating is disposed a rotary shaft of a movable wheel or a gear wheel.

The ADC 204 is used to sample the analog signal to convert it into a digital signal, which represents the mapping relation between a plurality of sampled positions of the movement distance (L) and a plurality of scanning amplitudes of the signal intensity A(V). In one embodiment of FIG. 4, the movement distance of the transverse axis is divided into the sampled positions L0~L11, and the signal intensity of the longitudinal axis is divided into the scanning amplitudes V0~V11. These sampled positions L0~L6 are respectively corresponding to the marks (namely the scanning amplitudes) V0 (0 Volt), V1 (0.1 Volt), V2 (0.2 Volt), V3 (0.3 Volt), V4 (0.4 Volt), V5 (0.5 Volt) and V6 (0.6 Volt), and forms an increasing area of the scanning amplitudes. These sampled positions L7~L11 are respectively corresponding to the marks (namely the scanning amplitudes) V7 (0.7 Volt), V8 (0.8 Volt), V9 (0.9 Volt), V10 (10 Volt) and V11 (11 Volt), and forms a decreasing area of the scanning amplitudes. The digital signal represents the mapping relation of the sampled positions L0~L11 and the scanning amplitudes of the marks V0~V11.

The calculation unit 206 detects a maximum amplitude and a minimum amplitude of these scanning amplitudes and calculates a limit amplitude difference between the maximum amplitude and the minimum amplitude. The calculation unit 206 further comprises a wave crest detector 206a, a wave trough detector 206b and an amplitude calculator 206c. The wave crest detector 206a is coupled between the ADC 204 and the normalization device 208, the wave trough detector 206b is coupled between the ADC 204 and the normalization device 208, and the amplitude calculator 206c is coupled between the ADC 204, the normalization device 208, the wave crest detector 206a and the wave trough detector 206b, as shown in FIG. 2. The wave crest detector 206a detects the maximum amplitude of these scanning amplitudes, for example the scanning amplitude of the mark V6, as shown in FIG. 4. The wave trough detector 206b detects the minimum amplitude of these scanning amplitudes, for example the scanning amplitude of the mark V0, as shown in FIG. 4. And the amplitude calculator 206c calculates the amplitude difference of the maximum amplitude (V6) and the minimum amplitude (V0), as shown in FIG. 4.

Figure 5:
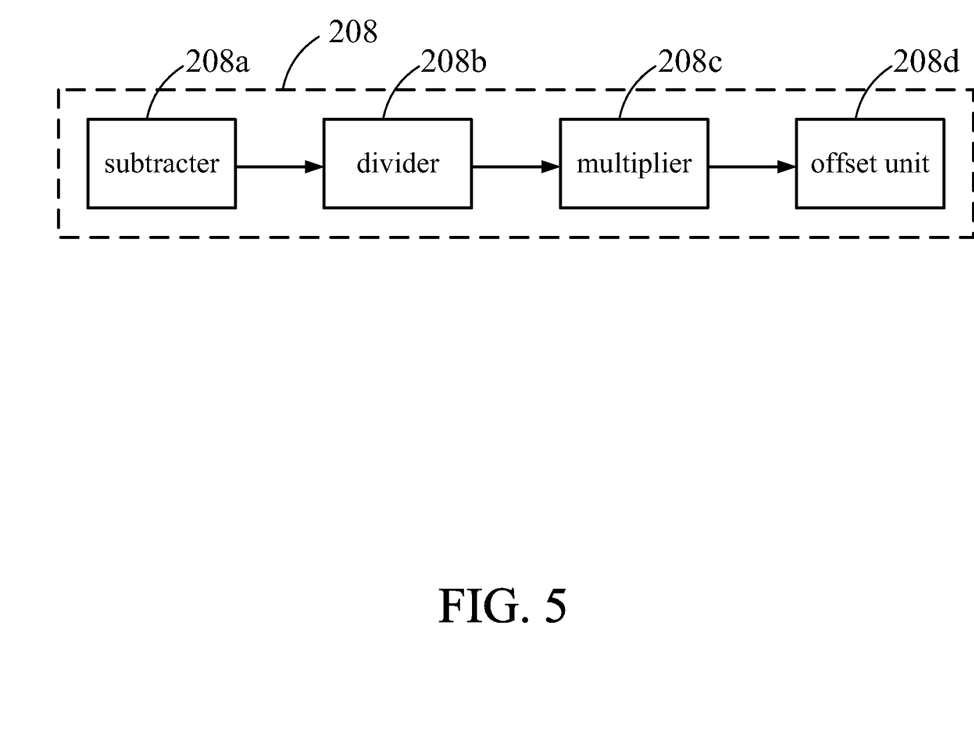
FIG. 5 is a detail block diagram of a normalization device in one embodiment of the present invention.

The normalization device 208 normalizes these scanning amplitudes according to each difference between these scanning amplitudes and the minimum amplitude, the limit amplitude difference and a predetermined target value. Referring to FIG. 5, which shows a detail block diagram of the normalization device 208 in one embodiment of the present invention. The normalization device 208 comprises a subtractor 208a, a divider 208b, a multiplier 208c and an offset unit 208d. The subtractor 208a is coupled to the divider 208b, the divider 208b is coupled to the multiplier 208c, and the multiplier 208c is coupled to the offset unit 208d. Specifically, the normalization device 208 normalizes these scanning amplitudes according to the following equation:

$$\text{a normalized scanning amplitude} = (V\_I - V\_S) \times (1/V\_PP) \times TA + O1 \quad \text{(E1)}$$

Where V_I represents the scanning amplitude, V_S represents the minimum scanning amplitude, V_PP represents the limit amplitude difference, TA represents the predetermined target value, and O1 represents an offset value corresponding to the difference (V_I–V_S). The TA is, for example, a positive integer, and when the difference (V_I–V_S) is negative, the O1 is added into the equation for making the normalized scanning amplitude greater than or equal to zero. Specifically, the normalization device 208 employs the subtractor 208a, the divider 208b, the multiplier 208c and the offset unit 208d to perform the above equation (E1), thereby producing the normalized scanning amplitudes. The object of the normalization processing is that: when these scanning amplitudes generates variation in the movement distance (L), the normalization device 208 can set these scanning amplitudes within a predetermined range according to the maximum amplitude and the minimum amplitude and by the TA. The variation mentioned herein means that the wave crest and the wave trough of the analog signal in each one of period (T) are different from those in other periods.

Next, when the hand-held scanning system 200 is moved to produce a former scanning amplitude and a present scanning amplitude of the normalized scanning amplitudes, the position variation detection unit 212 determines the sampled positions corresponding to the former scanning amplitude and the present scanning amplitude according to the LUT 210, thereby detecting whether the hand-held scanning system 200 is under a position variation status or not. When the sampled position corresponding to the former scanning amplitude is different from that corresponding to the present scanning amplitude, the hand-held scanning system 200 is under the position variation status. Specifically, as shown in FIG. 3C, Va~Vh represents the scanning amplitudes obtained during the scanning stage. By looking up the corresponding reference amplitudes in the LUT 210, it is found that Va is corresponding to the sampled positions L3 and L9, and Vb is corresponding to the sampled positions L3 and L3. When the scanning amplitude is varied from Va to Vb, the sampled position L3 is invariable, but the sampled position L9 is inversely varied to the sampled position L8. Because the movement distance of the hand-held scanning system 200 only may be continuously increasing or be fixed. When the movement distance is continuously increasing in order from left to right according to the marks of FIG. 3B, during the time of the scanning amplitude being varied from Va to Vb, the position of the hand-held scanning system 200 should be invariable on the position L3 of the former half of the period, but not variable from the position L9 to the position L8 of the latter half of the period (namely the movement distance can not be decreasing). In a word, because the sampled position L3 corresponding to the scanning amplitude varied from Va to Vb is fixed, one trigger signal cannot be activated. In a similar way. When the scanning amplitude is varied from Vc to Vd, it is ascertained that the corresponding sampled position is varied, thereby activating the trigger signal. When the scanning amplitude is varied from Ve to Vf, it is ascertained that the corresponding sampled position is varied, thereby activating the trigger signal. When the scanning amplitude is varied from Vg to Vh, it is ascertained that the sampled position L9 corresponding to the scanning amplitude varied from Vg to Vf is fixed, so that the trigger signal cannot be activated. The scanning trigger generator 214 generates one trigger signal according to the position variation status ascertained by the position variation detection unit 212, to activate an image sensor (not shown in all FIGS.) to scan the document. In other words, during the document-scanning stage, any two adjacent marks of Va~Vf represent the scanning amplitude (such as the normalized scanning amplitude). The present invention determines the sampled positions corresponding to the two adjacent marks for ascertain whether the trigger signal is activated or not. In one preferred embodiment, the LUT 210 represents the mapping relation of the reference amplitudes (or be named addresses) and the corresponding sampled positions. For example, one reference amplitude is corresponding to one sampled position. In practically using the LUT 210, the amplitudes Va~Vh may be respectively represented as one address, then two sampled positions corresponding to the address can be looked up in the LUT 210, and the two sampled positions can be represented by two bytes, such as a high byte and a low byte.

As the above-mentioned, the hand-held scanning system 200 of the present invention employs the ADC 204 to convert the analog signal generated by the analog encoder 202 into the digital signal. The digital signal is represented by the mapping relations between the sampled positions of the movement distance and the scanning amplitudes of the signal intensity. Next, the normalization device normalizes these scanning amplitudes. Then, the normalized scanning amplitudes can be used to create the LUT 210 for forming the mapping relation of the reference amplitudes and the corresponding sampled positions. In the LUT 210, one reference amplitude is corresponding to at least one sampled position, such as two corresponding sampled positions shown in FIG. 3C.

After the hand-held scanning system 200 scans the image of the document to obtain one scanning amplitude in the scanning stage, it can ascertain the mapping relation of the scanning amplitude and at least one corresponding sampled position (such as two corresponding sampled positions shown in FIG. 3C) by looking up in the LUT 210 for detecting whether the sampled position of the scanning amplitude is varied or not, and for determining whether the trigger signal is activated or not according to the variation status of the sampled position. The hand-held scanning system 200 of the present invention has solved the problem in the prior art, in which the position variation cannot be ascertained when the document is scanned at a non-constant velocity, but the hand-held scanning system 200 of the present invention can ascertain the position variation according to the variation of the scanning amplitude, thereby exactly sending out the trigger signal. The hand-held scanning system 200 of the present invention further solves the prior problem that the analog signal generated by the analog encoder 202 are asymmetrical in the signal intensities of the ascend curve and descend curve of one period, for improving the scanning quality. In other words, even if the hand-held scanning system 200 is moved suddenly fast or abruptly slow, the hand-held scanning system 200 of the present invention can exactly sends out the trigger signal and cannot be effected by the non-constant movement velocity thereof.

Figure 6A:
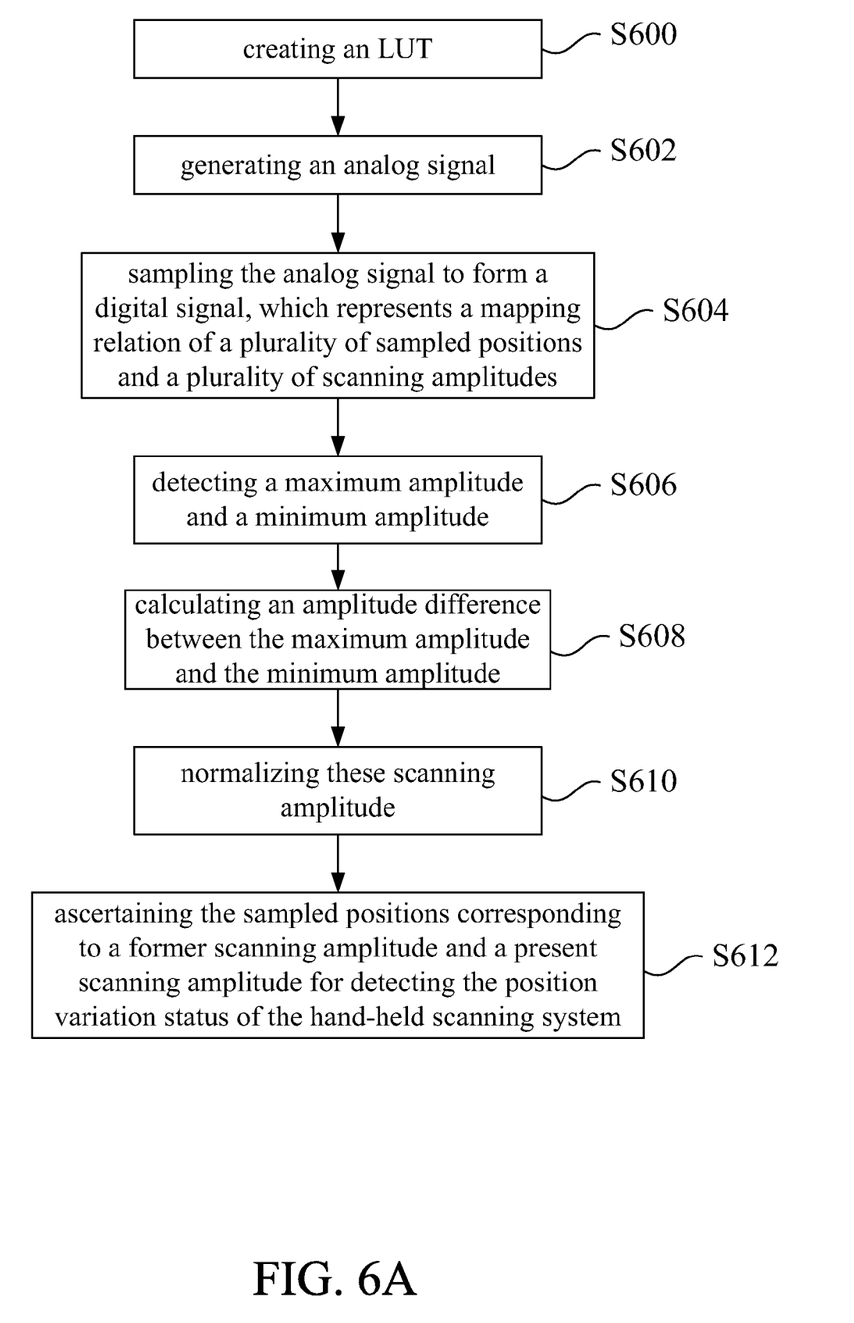
FIG. 6A is a flow chart of a scanning method of the hand-held scanning system according to one embodiment of the present invention.
Figure 6B:
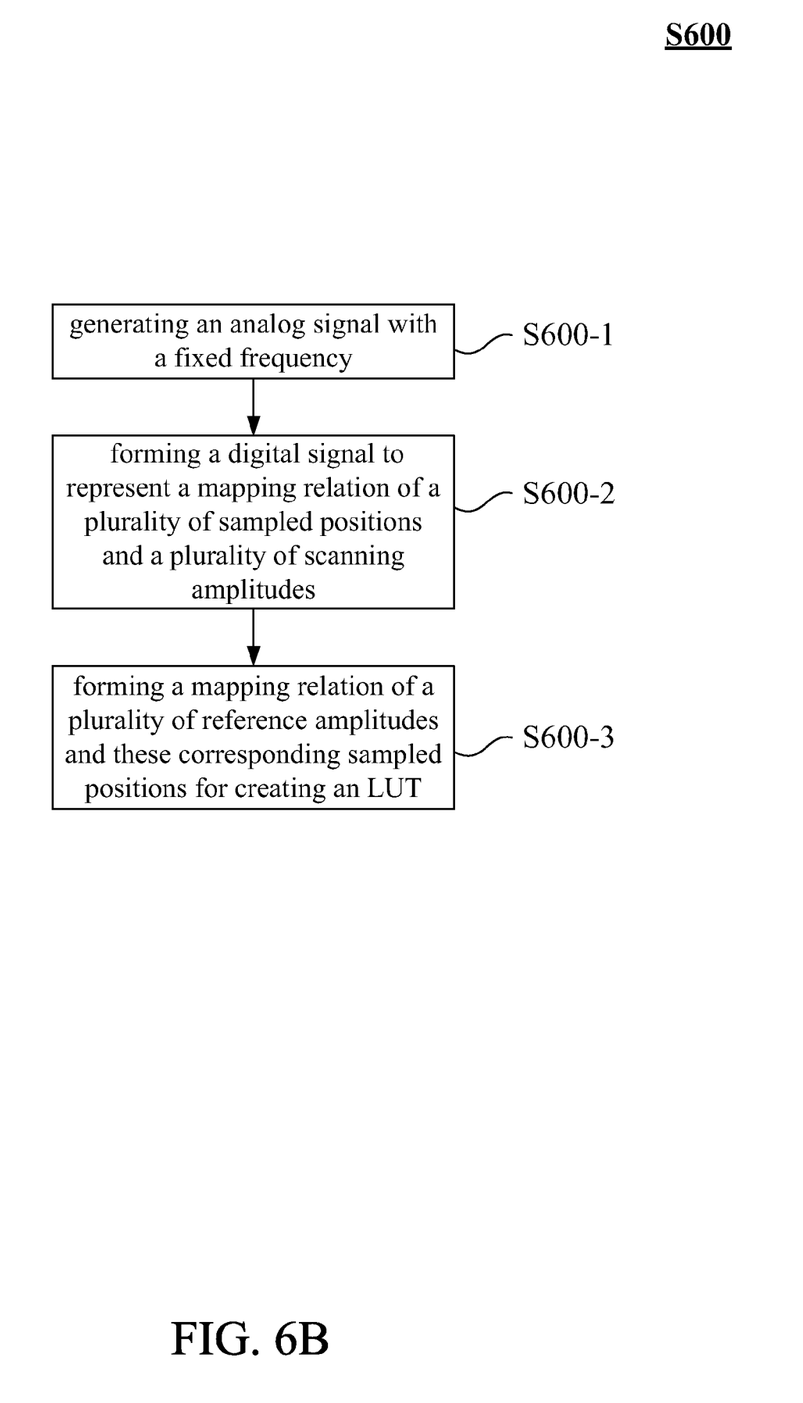
FIG. 6B is a flow chart of a method for creating a look-up table according to one embodiment of the present invention.

Referring to FIGS. 2, 6A and 6B, FIG. 6A shows a flow chart of a scanning method of the hand-held scanning system 200 according to one embodiment of the present invention, and FIG. 6B shows a flow chart of a method for creating the LUT 210 according to one embodiment of the present invention. The hand-held scanning system 200 comprises the analog encoder 202, the ADC 204, the calculation unit 206, the normalization device 208, the LUT 210, the position variation detection unit 212, the scanning trigger generator 214, the image sensing timing controller 216 and the scanned-image processing unit 218. The calculation unit 206 further comprises the wave crest detector 206a, the wave trough detector 206b and the amplitude calculator 206c. The normalization device 208 comprises the subtractor 208a, the divider 208b, the multiplier 208c and the offset unit 208d. The scanning method comprises the following steps:

In a step S600, creating the LUT 210 to form a mapping relation of a plurality of reference amplitudes and a plurality of corresponding sampled positions, wherein one reference amplitude is corresponding to one sampled position. The step S600 further comprises the following steps shown in FIG. 6B: a step S600-1 of employing the analog encoder 202 to generate the analog signal with a fixed frequency, in which an analog signal with the fixed frequency represents that a mapping relation of the movement distance of the hand-held scanning system 200 and the corresponding signal intensity is periodic; a step S600-2 of employing the ADC 204 to sample the analog signal of the fixed frequency of one period and convert it into a digital signal, which represents a mapping relation of a plurality of sampled positions of the movement distance and a plurality of scanning corresponding amplitudes of the signal intensity; and a step S600-3 of forming a mapping relation of a plurality of reference amplitudes and these corresponding sampled positions to make one reference amplitude be corresponding to at least one sampled positions for creating the LUT 210.

In a step S602, the analog encoder 202 generates an analog signal, which represents that a mapping relation of the movement distance of the hand-held scanning system 200 and the corresponding signal intensity.

In a step S604, the ADC 204 samples the analog signal and converts it into a digital signal, which represents a mapping relation of a plurality of sampled positions of the movement distance and a plurality of corresponding scanning amplitudes of the signal intensity.

In a step S606, the calculation unit 206 detects a maximum amplitude and a minimum amplitude of these scanning amplitudes.

In a step S608, the calculation unit 206 calculates an amplitude difference between the maximum amplitude and the minimum amplitude.

In a step S610, the normalization device 208 normalizes these scanning amplitudes according to each difference between these scanning amplitudes and the minimum amplitude, the amplitude difference and a predetermined target value. The normalization device 208 normalizes these scanning amplitudes according to the following equation:

$$\text{a normalized scanning amplitude} = (V\_I - V\_S) \times (1/V\_PP) \times TA + O1 \quad (E1)$$

where V_I represents the scanning amplitude, V_S represents the minimum scanning amplitude, V_PP represents the amplitude difference, TA represents the predetermined target value, and O1 represents an offset value corresponding to the difference (V_I–V_S).

In a step S612, when the hand-held scanning system 200 is moved, the position variation detection unit 212 ascertains the sampled positions corresponding to a former scanning amplitude and a present scanning amplitude of the above normalized scanning amplitudes according to the LUT 210, for detecting whether the hand-held scanning system 200 is under a position variation status or not. When the sampled positions corresponding to the former scanning amplitude and the present scanning amplitude are different from each other, the hand-held scanning system 200 is under the position variation status.

In a step S614, the scanning trigger generator 214 generates a trigger signal according to the position variation status.

In conclusion, the present invention provides the hand-held scanning system and the method thereof for creating the LUT and forming the mapping relation of a plurality of reference amplitudes and a plurality of corresponding sampled positions. Next, the ADC converts the analog signal generated by the analog encoder into the digital signal, which represents a plurality of sampled positions of the movement distance and a plurality of corresponding scanning amplitudes of the signal intensity. Next, the normalization device normalizes these scanning amplitudes. Then, during the scanning stage, the hand-held scanning system determines the sampled positions corresponding to the former scanning amplitude and the present scanning amplitude of the above normalized scanning amplitudes according to the LUT for detecting whether the hand-held scanning system is under a position variation status or not to ascertain whether the trigger signal is activated for image scanning or not. Therefore, the hand-held scanning system and the method thereof in the present invention can improve the scanning quality.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hand-held scanning system, comprising:
an analog encoder, generating an analog signal, wherein the analog signal represents a mapping relation of a movement distance of the hand-held scanning system and a corresponding signal intensity;
an analog-to-digital converter being coupled to the analog encoder for sampling the analog signal to form a digital signal, wherein the digital signal represents a mapping relation between a plurality of sampled positions of the movement distance and a plurality of corresponding scanning amplitudes of the signal intensity;
a look-up table, representing a mapping relation between a plurality of amplitudes and these corresponding sampled positions;
a position variation detection unit being coupled to the look-up table, and ascertaining the sampled position corresponding to a former scanning amplitude and a present scanning amplitude of these scanning amplitudes according to the look-up table for detecting whether the hand-held scanning system being under a position variation status or not when the hand-held scanning system being moved; and a scanning trigger generator, generating a trigger signal according to the position variation status to activate an image sensor of the hand-held scanning system for image scanning.

2. The hand-held scanning system as claimed in claim 1, further comprising:
a calculation unit being coupled to the analog-to-digital converter to detect a maximum amplitude and a minimum amplitude of these scanning amplitudes and calculate an amplitude difference between the maximum amplitude and the minimum amplitude; and
a normalization device being coupled the analog-to-digital converter and the calculation unit to normalize these scanning amplitudes according to each difference between these scanning amplitudes and the minimum amplitude, the amplitude difference and a predetermined target value.

3. The hand-held scanning system as claimed in claim 1, wherein the calculation unit comprises:
a wave crest detector being coupled between the analog-to-digital converter and the normalization device for detecting a maximum amplitude of these scanning amplitudes;
a wave trough detector being coupled between the analog-to-digital converter and the normalization device for detecting a minimum amplitude of these scanning amplitudes; and
an amplitude calculator being coupled between the analog-to-digital converter, the normalization device, the wave crest detector and the wave trough detector for calculating the amplitude difference of the maximum amplitude and the minimum amplitude.

4. The hand-held scanning system as claimed in claim 1, further comprising:
an image sensing timing controller being coupled the scanning trigger generator and activating the image sensor according to the trigger signal to produce a scanned image; and
a scanned-image processing unit being coupled to the scanning trigger generator to process the scanned image.

5. The hand-held scanning system as claimed in claim 1, wherein the analog signal is a sine-like wave.

6. A scanning method of a hand-held scanning system, comprising the following steps of:
(a) creating a look-up table to form a mapping relation of a plurality of reference amplitudes and a plurality of corresponding sampled positions;
(b) employing an analog encoder to generate an analog signal, wherein the analog signal represents that a mapping relation of a movement distance of the hand-held scanning system and a corresponding signal intensity;
(c) employing an analog-to-digital converter to sample the analog signal for forming a digital signal, wherein the digital signal represents a mapping relation of these sampled positions of the movement distance and a plurality of corresponding scanning amplitudes of the signal intensity;
(d) employing a position variation detection unit to ascertain the sampled positions corresponding to a former scanning amplitude and a present scanning amplitude of these scanning amplitudes according to the look-up table for detecting whether the hand-held scanning system being under a position variation status or not when the hand-held scanning system being moved; and
(e) employing a scanning trigger generator to generate a trigger signal according to the position variation status and activate an image sensor of the hand-held scanning system for image scanning.

7. The scanning method as claimed in claim 6, comprising the following steps after the step (b):
(b1) employing a calculation unit to detect a maximum amplitude and a minimum amplitude of these scanning amplitudes; and
(b2) employing the calculation unit to calculate an amplitude difference between the maximum amplitude and the minimum amplitude.

8. The scanning method as claimed in claim 7, comprising the following step after the step (b2):
(b3) employing a normalization device to normalize these scanning amplitudes according to each difference between these scanning amplitudes and the minimum amplitude, the amplitude difference and a predetermined target value.

9. The scanning method as claimed in claim 8, wherein these scanning amplitudes can be normalized according to the following equation:

$$\text{a normalized scanning amplitude} = (V\_I - V\_S) \times (1/V\_PP) \times TA + O1 \quad (E1)$$

where V_I represents the scanning amplitude, V_S represents the minimum scanning amplitude, V_PP represents the amplitude difference, TA represents the predetermined target value, and O1 represents an offset value corresponding to the difference (V_I–V_S).

10. The scanning method as claimed in claim 6, comprising the following steps after the step (e):
(f) employing an image sensing timing controller to activate the image sensor according to the trigger signal for producing a scanning image; and
(g) employing a scanned-image processing unit to process the scanned image.

11. The scanning method as claimed in claim 6, wherein the step (a) further comprises the following steps:
(a1) employing the analog encoder to generate an analog signal with a fixed frequency, wherein the analog signal with the fixed frequency represents that a mapping relation of a movement distance of the hand-held scanning system and a corresponding signal intensity is periodic;
(a2) employing the analog-to-digital converter to sample the analog signal with the fixed frequency on one period for forming a digital signal, wherein the digital represents a mapping relation of a plurality of sampled positions of the movement distance and a plurality of corresponding scanning amplitudes of the signal intensity; and
(a3) forming a mapping relation of a plurality of reference amplitudes and these corresponding sampled positions to make one reference amplitude be corresponding to at least one sampled positions for creating the look-up table.

12. The scanning method as claimed in claim 11, comprising the following step after the step (a2):
(a21) employing a normalization device to normalize these scanning amplitudes according to each difference between these scanning amplitudes and a minimum amplitude, an amplitude difference and a predetermined target value.

13. The scanning method as claimed in claim 12, wherein these scanning amplitudes can be normalized according to the following equation:

$$\text{a normalized scanning amplitude} = (V\_I - V\_S) \times (1/V\_PP) \times TA + O1 \quad (E1)$$

where V_I represents the scanning amplitude, V_S represents the minimum scanning amplitude, V_PP represents the amplitude difference, TA represents the predetermined target value, and O1 represents an offset value corresponding to the difference (V_I−V_S).

* * * * *